United States Patent
Son et al.

(10) Patent No.: US 11,948,316 B2
(45) Date of Patent: Apr. 2, 2024

(54) CAMERA MODULE, IMAGING DEVICE, AND IMAGE PROCESSING METHOD USING FIXED GEOMETRIC CHARACTERISTICS

(71) Applicant: Samsung Electronics Co., Ltd., Suwon-si (KR)

(72) Inventors: Bongki Son, Hwaseong-si (KR); Sangmin Kim, Yongin-si (KR); Jeongyong Shin, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 394 days.

(21) Appl. No.: 17/186,222

(22) Filed: Feb. 26, 2021

(65) Prior Publication Data
US 2021/0287384 A1    Sep. 16, 2021

(30) Foreign Application Priority Data

Mar. 11, 2020 (KR) .......... 10-2020-0030382
Jul. 24, 2020 (KR) .......... 10-2020-0092549

(51) Int. Cl.
*G06T 7/50* (2017.01)
*G06T 1/60* (2006.01)
*G06T 3/18* (2024.01)
*G06T 3/4038* (2024.01)

(52) U.S. Cl.
CPC .......... *G06T 7/50* (2017.01); *G06T 1/60* (2013.01); *G06T 3/18* (2024.01); *G06T 3/4038* (2013.01); *G06T 2207/20221* (2013.01)

(58) Field of Classification Search
CPC .......... G06T 7/50; G06T 1/60; G06T 3/0093
USPC ........................................... 382/154
See application file for complete search history.

(56) References Cited

U.S. PATENT DOCUMENTS

| | | | |
|---|---|---|---|
| 6,811,264 | B2 | 11/2004 | Raskar et al. |
| 7,855,752 | B2 | 12/2010 | Baker et al. |
| 8,571,355 | B2 | 10/2013 | Lee et al. |
| 9,294,654 | B2 | 3/2016 | Tanaka et al. |
| 9,355,433 | B1 | 5/2016 | Adsumilli et al. |
| 9,811,946 | B1 | 11/2017 | Hung et al. |
| 10,089,538 | B2 | 10/2018 | Molin et al. |
| 10,547,825 | B2 | 1/2020 | Sadi et al. |
| 2019/0019279 | A1 | 1/2019 | Kumar et al. |

(Continued)

FOREIGN PATENT DOCUMENTS

JP     4554231 B2     9/2010
JP     2020160773 A  * 10/2020    ............ G06T 1/20

OTHER PUBLICATIONS

English Translation of JP 2020160773 A. (Year: 2020).*

*Primary Examiner* — Ayodeji O Ayotunde
(74) *Attorney, Agent, or Firm* — Muir Patent Law, PLLC

(57) ABSTRACT

A camera module may include an image sensor including an optical device configured to rotate about at least one of an x-axis, a y-axis, and a z-axis perpendicular to each other, in response to a mode signal, and configured to generate a plurality of first images, each first image generated when the optical device is at a different position; and an image signal processor (ISP) configured to process the plurality of first images, wherein the ISP is further configured to obtain a plurality of parameters pre-stored according to the mode signal, correct the plurality of first images by using the plurality of parameters, and generate a second image by merging the corrected first images.

14 Claims, 14 Drawing Sheets

(56) References Cited

U.S. PATENT DOCUMENTS

2020/0020075 A1    1/2020  Khwaja et al.
2021/0218894 A1*  7/2021  Stec .................... H04N 23/683

* cited by examiner

CAMERA MODULE, IMAGING DEVICE, AND IMAGE PROCESSING METHOD USING FIXED GEOMETRIC CHARACTERISTICS

CROSS-REFERENCE TO RELATED APPLICATIONS

This application is based on and claims priority under 35 U.S.C. § 119 to Korean Patent Application Nos. 10-2020-0030382, filed on Mar. 11, 2020 and 10-2020-0092549, filed on Jul. 24, 2020 in the Korean Intellectual Property Office, the disclosures of which are incorporated by reference herein in their entirety.

BACKGROUND

The technical idea of the present disclosure relates to a camera module, and in detail, to a camera module, an imaging device, and an image processing method for obtaining a high-resolution image by using a fixed geometric characteristic.

As the demand for high-resolution images increases, a pixel size is also decreasing. The decrease in the pixel size causes an increase in cross-talk between adjacent pixels and a decrease in a signal to noise ratio (SNR) due to a small amount of light. Therefore, the pixel size cannot be decreased continuously.

In order to generate a high-resolution image by merging a plurality of images generated from a single image sensor, a method such as homography transformation, lens distortion correction, and image warping may be used. Typically, however, a large amount of computation is required to perform the homography transformation, the lens distortion correction, and the image warping in real time. Therefore, other methods of generating high-resolution images by merging a plurality of images may be useful.

SUMMARY

The present disclosure provides a camera module, an imaging device, and an image processing method for obtaining a high-resolution image by using a fixed geometric characteristic.

In order to achieve the above object, a camera module according to an aspect of the present disclosure may include an image sensor including an optical device configured to rotate about at least one of an x-axis, a y-axis, and a z-axis perpendicular to each other, in response to a mode signal, and being configured to generate a plurality of first images, each first image generated when the optical device is at a different position; and an image signal processor (ISP) configured to process the plurality of first images, wherein the ISP is further configured to obtain a plurality of parameters previously stored according to the mode signal, correct the plurality of first images by using the plurality of parameters, and generate a second image by merging the corrected first images.

An image processing method according to an aspect of the present disclosure, includes generating an image with a large angle of view from an image with a small angle of view. The method may include generating a plurality of first images by rotating an optical device which uses a lens or a mirror about at least one of an x-axis, a y-axis, and a z-axis perpendicular to each other, in response to a mode signal, each first image generated when the optical device is at a different position; correcting the plurality of first images based on first parameters corresponding to the mode signal among a plurality of pre-stored parameters; and generating a second image larger than the first image by merging the corrected first images.

An imaging device according to an aspect of the present disclosure may include a first image sensor configured to generate a plurality of first images by rotating an optical device which uses a lens or a mirror in at least one direction of yawing, pitching, and rolling based on a first mode signal; a second image sensor configured to generate a large-view angle image having a larger angle of view than the plurality of first images; and an image signal processor (ISP) configured to process the plurality of first images, wherein the ISP corrects the plurality of first images based on a plurality of parameters stored in advance, and generates a second image by merging the corrected first images.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, example embodiments of the present disclosure will be described in detail with reference to the accompanying drawings.

Figure 1:
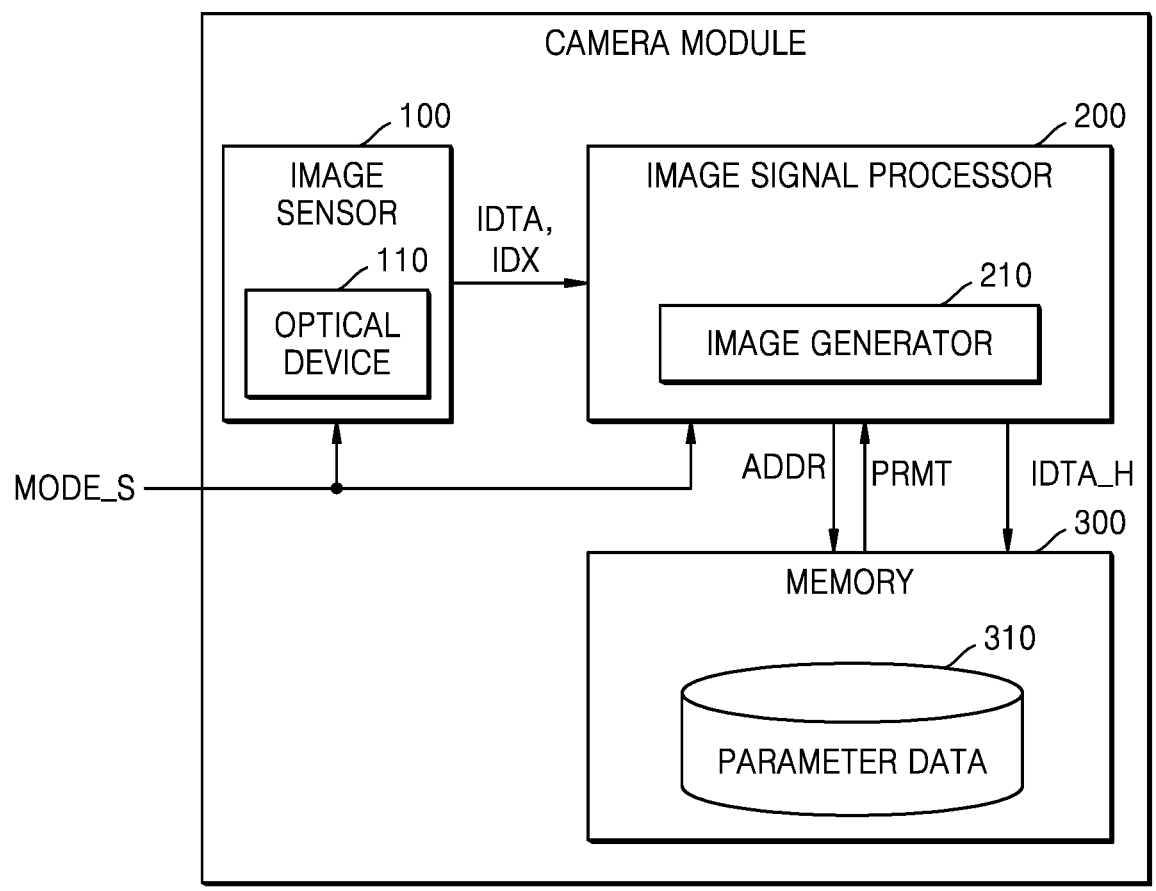
FIG. 1 is a block diagram illustrating a camera module according to an example embodiment of the present disclosure.

FIG. 1 is a block diagram showing a camera module 10 according to an example embodiment of the present disclosure.

Referring to FIG. 1, the camera module 10 may include an image sensor 100, an image signal processor (ISP) 200, and a memory 300. The image sensor 100 may include an optical device 110, the ISP 200 may include an image generator 210, and the memory 300 may store parameter data 310. Items described herein as modules, devices, or units, or using suffixes such as ~er or ~or refer to combinations of hardware, firmware, and/or software that may include various circuits and other components configured to operate the various steps and methods described herein.

The camera module 10 may capture and/or store an image of a subject using a solid-state image sensor such as a charge-coupled device(CCD) or a complementary metal oxide semiconductor (CMOS), and may be implemented as part of a digital camera, digital camcorder, mobile phone, tablet computer, or other portable electronic device. The portable electronic device may include a laptop computer, mobile phone, smart phone, tablet PC, personal digital assistant (PDA), enterprise digital assistant (EDA), digital still camera, digital video camera, audio device, portable multimedia player (PMP), and personal navigation device (PND), MP3 player, handheld game console, e-book, wearable device, and the like. In addition, the camera module 10 may be mounted on an electronic device such as a drone and an advanced driver assistance system (ADAS), or may be mounted on an electronic device provided as a component in vehicles, furniture, manufacturing facilities, doors, and various measuring devices.

The image sensor 100 may convert optical signals of a subject incident through an optical lens into electrical signals, generate image data IDTA based on the electrical signals, and output image data IDTA and an index IDX corresponding to the sensed order of the image data IDTA. The index IDX may include spatial coordinates of a plurality of image data sets IDTAs. The image sensor 100 may be mounted on an electronic device having an image or light sensing function.

According to an example embodiment of the present disclosure, the image sensor 100 may include an optical device 110. The optical device 110 may be an optical condensing device including a mirror and a lens. The optical device 110 may acquire a plurality of images for one scene by rotating in at least one of an x-axis, a y-axis, and a z-axis perpendicular to each other. In an example embodiment, the optical device 110 may acquire different scenes by moving vertically and horizontally through rotation in the pitch and yaw directions. The optical device 110 may include or may be connected to one or more actuators that receive instructions from a processor to move a light-receiving portion of the optical device 110 vertically and horizontally. Thus, the optical device 110, or part of the optical device, can move within and with respect to the camera module 10.

Hereinafter, for convenience of explanation, as an embodiment of the optical device 110, a lens such as a prism lens is exemplified. However, the present invention is not limited thereto, and may use an optical device capable of condensing various paths of light reflected by an object by using optical characteristics such as dispersion or refraction of light, or changing a movement path of light.

According to an example embodiment of the present disclosure, the image sensor 100 may sense a plurality of image data sets IDTAs while moving the optical device 110 up, down, left and right (i.e., vertically and horizontally) based on a mode signal MODES. For example, the image sensor 100 of the present invention may arrange the sensed image data IDTA for one scene in the form of an M×N matrix(M is the number of rows, N is the number of columns, and M and N are integers of 2 or more) based on the mode signal MODES. The optical device 110 may have a vertical and horizontal rotation angle limited within a certain range, and rotates within a certain angle to capture an image. As a result, the image data IDTA sensed by the optical device 110 may have a fixed geometric characteristic.

As discussed herein, image data IDTA may refer to an entire image data for an image, and image data sets IDTA_(or a set of image data IDTA) may refer to subsets of that data, for example, obtained at different times using different positionings of an optical device such as a lens. A plurality of data sets IDTA may be obtained and combined and/or processed in order to result in an image that includes image data IDTA.

The mode signal MODES may indicate an arrangement method of the image data IDTA sensed by the image sensor 100. For example, the image sensor 100 may arrange the sensed image data IDTA based on the mode signal MODES indicating a first mode in a 3×3 matrix, may arrange the image data IDTA based on the mode signal MODES indicating the second mode in a 5×5 matrix, and may arrange the image data IDTA based on the mode signal MODES indicating the third mode in a matrix of 3×4 (or, in some cases, 4×3). In addition to the arrangement method of the image data IDTA, the mode signal MODES may indicate a sensing method of obtaining the image data IDTA. According to an example embodiment, the mode signal MODES may be set by a user's manipulation. The image sensor 100 or camera module 10 may include a set of instructions (e.g., computer program code) that causes the optical device 110 to be sequentially moved to a series of consecutive positions at which image data is captured.

The image sensor 100 may provide an index IDX indicating the sensing order of the arranged image data IDTA. The index IDX may correspond to a temporal sequence of sensing, and may be related to position information or coordinates of image data IDTA used for image correction to be described later.

Since the sensed image data IDTA has a fixed geometric characteristic, the array (and/or number) of the image data sets (IDTA) and the index (IDX) may sufficiently include geometric characteristic information of the image sensor 100 (in particular, the condensed optical device 110) that senses the image data IDTA.

In FIG. 1, only one image sensor 100 is illustrated for convenience of description, but the present invention is not limited thereto, and a case in which a plurality of image sensors exist may be assumed. Each of the plurality of image sensors may have the same resolution, but a first image sensor may have a relatively narrow angle of view, and a second image sensor may have a relatively wide angle of view. The first image sensor may be referred to as a tele sensor, and the second image sensor may be referred to as a wide sensor. A case in which a plurality of image sensors (or a plurality of camera modules) are used will be described later with reference to FIGS. 11 to 12.

The ISP 200 may receive image data IDTA, which is an output signal of an output buffer of an image sensor, and perform image processing so that an image is good for human viewing. For example, the ISP 200 may perform image processing (e.g., changing the Bayer pattern image data into YUV or RGB format) to change the data format on the image data IDTA, or may perform image processing to improve image quality such as noise removal, brightness adjustment, and sharpness adjustment. In FIG. 1, the image signal processor ISP 200 is illustrated to be located separately from the image sensor 100, but it is not limited thereto, and a part of the ISP 200 may be located inside the image sensor 100.

The ISP 200 may include an image generator 210. The image generator 210 may know in advance the arrangement (e.g., spatial arrangement) and number of image data sets IDTA to be sensed by the image sensor 100 by receiving the mode signal MODES. For example, by receiving the mode signal MODES indicating the first mode, the image generator 210 may know in advance that 9 first images in which image data IDTA is arranged in a 3×3 matrix form will be received.

The image generator 210 may determine the order in which the image data IDTA was photographed based on the index IDX, and may extract spatial coordinates (i.e., the degree of rotation of the prism lens) of the image data IDTA based on the photographing order and a known positioning of the optical device 110 associated with each set of image data IDTA.

The image generator 210 may include parameter data 310 stored in the memory 300. According to an example embodiment, the parameter data 310 may include parameters for pre-processing or post-processing of image data IDTA, such as parameters related to homography transformation, parameters related to lens distortion correction and parameters related to image warping. The image generator 210 may output an address ADDR of a space in which the parameter data 310 stored in the memory 300 based on the mode signal MODES is stored, and as a result, the parameter PRMT may be provided. For example, the ISP 200 may provide an address ADDR for calling the plurality of parameters PRMT to the memory 300 based on the mode signal MODE_S, and the memory 300 may provide a plurality of parameters PRMT corresponding to the mode signal MODES to the ISP 200 based on the address ADDR.

The image generator 210 may determine an arrangement of the image data IDTA, a photographing sequence, and spatial coordinates (that is, the degree of rotation of the optical device 110) based on the mode signal MODES and the index IDX, and may stitch a plurality of image data sets IDTAs into resulting image data IDTA_H having a high-view angle using a parameter PRMT corresponding to the degree of rotation of the optical device 110.

A large amount of computation is required to perform the homography transformation, the lens distortion correction, and the image warping in real time. According to one technical idea of the present disclosure, by loading parameters (PRMT) corresponding to the mode signal (MODE_S) (e.g., homography transformation value, lens distortion transformation value, and image warping table associated with a particular optical device position for each image data set IDTA), the calculation process accompanying the estimation process (i.e., transformation process) of the parameter PRMT may be omitted, and the computation amount of the ISP 200 may be reduced. As a result, the image generator 210 according to an example embodiment of the present disclosure may quickly merge a plurality of image data sets IDTAs by loading a pre-stored parameter PRMT without performing parameter estimation for post-processing or conversion of the image data IDTA in real time. The merging may be performed automatically by the image generator 210, without the need for user interaction, external software, or complicated real-time parameter determination computations.

The image generator 210 may generate a high-view angle image IDTA_H having a size larger than the image sensed by the image sensor 100 by stitching the plurality of image data sets IDTAs. The image generator 210 according to the present invention may acquire a second image with a wide angle of view by merging first images continuously sensed by a first image sensor having a narrow angle of view. The second image generated by merging the images having a narrow angle of view may have a higher resolution than a third image sensed by a second image sensor having the same resolution as the first image sensor but a wide angle of view.

The memory 300 may be implemented as a volatile memory or a nonvolatile memory. Volatile memory may include Dynamic Random Access Memory (DRAM), Static RAM (SRAM), and the like, and nonvolatile memory may include Read Only Memory (ROM), Programmable ROM (PROM), Electrically Programmable ROM (EPROM), and Electrically Erasable and Programmable ROM), Flash memory, Phase-change RAM(FRAM), Magnetic RAM(M-RAM), Resistive RAM(RRAM), Ferroelectric RAM (FRAM), and the like. According to an example embodiment, the memory 300 is included in the camera module 10 and may be a one-time programmable (OTP) memory. The parameter data 310 including a homography transformation value, a lens distortion conversion value, an image warping table, and the like may be stored in a specific area of the internal space of the memory 300. When receiving the address ADDR of a specific area in which the parameter PRMT is stored, the memory 300 may provide the parameter PRMT stored in the corresponding storage area.

The parameter data 310 may store parameters PRMT for various cases corresponding to the mode signal MODES. For example, the parameters PRMT may include first parameters used to transform image data IDTA arranged in a 3×3 matrix form with reference to the index IDX in response to the mode signal MODES indicating the first mode, and second parameters used to transform the image data IDTA arranged in a 5×5 matrix form with reference to the index IDX in response to the mode signal MODES indicating the second mode. However, the present invention is not limited thereto, and various parameters for transforming image data IDTA arranged in various forms may be calculated and stored in advance.

According to the camera module 10 according to embodiments of the present disclosure, images of a wide angle of view may be obtained by merging images of a narrow angle of view continuously sensed. The merged image of the wide angle of view may have a higher resolution than an image captured by a device that captures an image of a wide angle of view having the same number of pixels as a device that captures images of a narrow angle of view.

In addition, the imaging device according to embodiments of the present disclosure, compared to the imaging device having the same size as the image sensor of the present imaging device but having a larger number of pixels than the present imaging device, may sufficiently secure an inter-pixel spacing, so that the occurrence of crosstalk may be reduced, and SNR may be improved. Further, the imaging device according to embodiments of the present disclosure may skip the calculation step by loading calculated and stored in advance homography transformation, lens distortion correction, and image warping transformation, so that the speed of image generation (or processing) may be improved.

Figure 2:
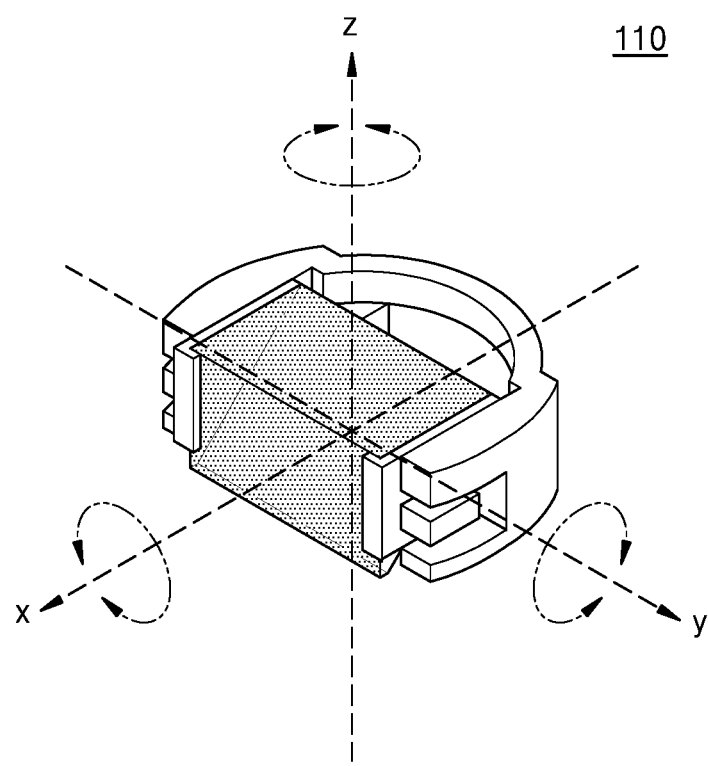
FIG. 2 is a diagram of a prism lens according to an example embodiment of the present disclosure.

FIG. 2 is a diagram of an optical device 110 according to an example embodiment of the present disclosure.

Referring to FIG. 2, the optical device 110 may include an x-axis, a y-axis, and a z-axis, that is, a total of three spatial rotation axes. The optical device 110 may sense an object by rotating about at least one of the x-axis, y-axis, and z-axis.

Rotation around the x-axis of the optical device 110 may be referred to as rolling (horizontal shaking). Rotation around the y-axis of the optical device 110 may be referred to as pitching (vertical shaking). Rotation around the z-axis of the optical device 110 may be referred to as yawing.

According to an example embodiment, rotation in the pitch direction may be understood as rotation in the x-axis direction passing through a prism filter of the image sensor 100 in the horizontal direction, rotation in the yaw direction may be understood as rotation in the z-axis direction vertically penetrating the prism filter of the image sensor 100, and rotation in the roll direction may be understood as rotation in the y-axis direction passing through the prism filter of the image sensor in the longitudinal direction.

The image sensor 100 may have a threshold angle of view for capturing an object. The threshold angle of view may be limited by a user's setting or may be limited by a physical limit of the image sensor 100. For example, when the image sensor 100 is embedded in the camera module 10, the threshold angle of view of the image sensor 100 does not exceed 180 degrees.

According to an example embodiment of the present disclosure, the optical device 110 may sense a subject in front of the optical device 110 by using pitching and yawing. The optical device 110 may sense the left and right (peripherals) of the subject (center) through yawing, and sense the upper and lower (periphery) of the subject (center) through pitching. That is, the upper, lower, left, and right peripheral portions of the subject may be sensed through pitching and yawing.

The rolling may occur in the optical device 110. The rolling may be independent of rotation in the up, down, left and right directions of the subject. In this case, the rolling may be used for removing the user's hand shake, pre-processing or post-processing steps for accurate image correction.

Figure 3:
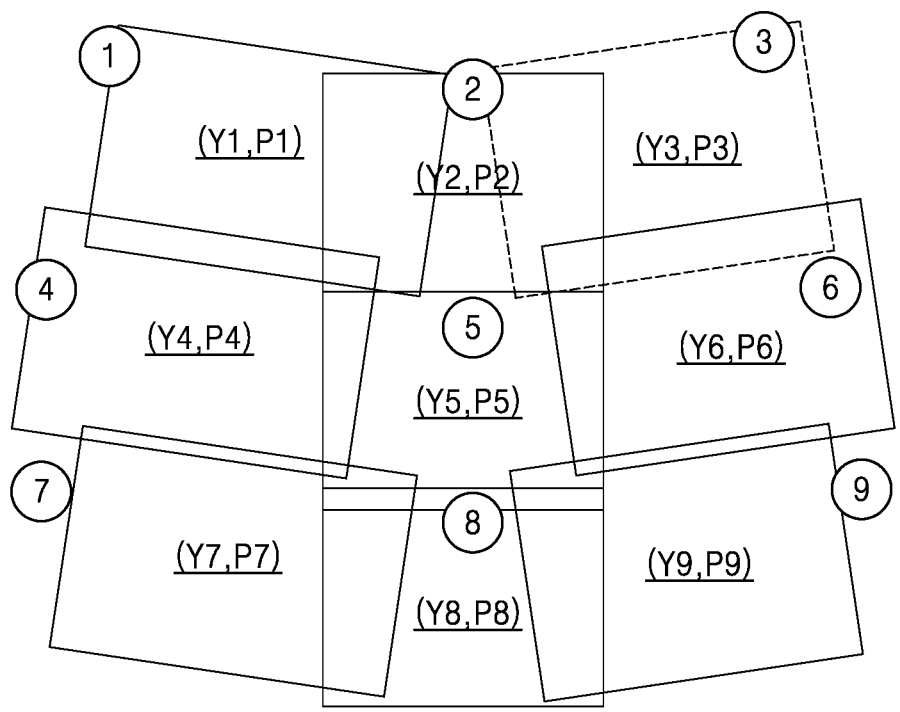
FIG. 3 is a diagram illustrating a plurality of images sensed by a prism lens according to an example embodiment of the present disclosure.

FIG. 3 is a diagram illustrating a plurality of image data sets IDTAs sensed by the optical device 110 according to an example embodiment of the present disclosure. FIG. 1 is referenced together with FIG. 3.

Referring to FIG. 3, the image sensor 100 may output image data IDTA and index IDX based on the mode signal MODE_S.

The image sensor 100 may check the arrangement (and/or the number) of image data sets IDTA to be sensed by the image sensor 100 by receiving the mode signal MODE_S. For example, when a mode signal MODES indicating the first mode is received, the optical device 110 may rotate up, down, left and right relative to the front of the subject. As a result, a total of nine image data sets IDTAs, three horizontally and three vertically, may be sensed by the image sensor 100.

According to embodiments of the present disclosure, the image data IDTA may include fixed geometric characteristic information of the optical device 110. In detail, the arrangement of image data IDTA obtained through the rotation range and rotation range of the optical device 110 may be different according to the mode signal MODE_S. However, since the mode signal MODES also instructs the rotation of the optical device 110 within a predetermined range and set of positions, geometric characteristic information (e.g., yaw, pitch, etc.) of image data IDTA obtained through rotation may always be constant.

According to an example embodiment of the present disclosure, image data IDTA of a 3×3 matrix array may be sequentially sensed, based on the mode signal MODE_S indicating the first mode. The optical device 110 may rotate once to the left and then to the right via the center, and the image sensor 100 may sense three images during the first horizontal rotation. After that, the optical device 110 may rotate downward once and then rotate from left to right via the center again, and the image sensor 100 may sense three images during the second horizontal rotation. Similarly, the optical device 110 may rotate downward once more and then from left to right, and the image sensor 100 may sense three images during the third horizontal rotation.

The image sensor 100 may generate 9 image data sets IDTA of the sensed 3×3 array, and may provide an index IDX from 1 to 9 according to the rotation order of the optical device 110. Since there are 9 image data sets IDTA, numbers from the first frame to the ninth frame may be sequentially numbered from the upper left to the lower right. In this case, the fifth frame may exist in front of the image sensor 100 and may be a sensed frame, and the fourth frame may have the same pitch as the fifth frame, but may have a large yaw value. The second frame has the same yaw as the fifth frame, but may have a large pitch, etc. Ordinal numbers such as "first," "second," "third," etc. may be used herein as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim), depending on context.

According to an example embodiment of the present disclosure, spatial coordinates of a plurality of image data sets IDTAs may be given in the form of (Y, P). For example, the spatial coordinates of the first image data may be (Y1, P1), the spatial coordinates of the second image data may be (Y2, P2), the spatial coordinates of the third image data may be (Y3, P3), the spatial coordinates of the fourth image data may be (Y4, P4), the spatial coordinates of the fifth image data may be (Y5, P6), the spatial coordinates of the sixth image data may be (Y6, P6), the spatial coordinates of the seventh image data may be (Y7, P7), the spatial coordinates of the eight image data may be (Y8, P8), and the spatial coordinates of the ninth image data may be (Y9, P9).

Since the image sensor 100 senses an object while rotating, an object at the side may be distorted rather than an object at the front when an image is captured. In order to account for this, homography transformation may be performed, but a large amount of computation is required. Therefore, according to some embodiments, the image sensor 100 may always determine an array of sensed images based on the same fixed geometric image structure (e.g., based on the same set of pre-set optical device positions), and may calculate a homography transform value in advance and store the homography transform value in a memory. The ISP 200 may omit or drastically reduce the computation process by using a fixed geometric property for the sensed image. As a result, the amount of computation required to perform homography transformation may be reduced or there may be no amount of computation, and an image generation or readout speed may be improved.

The ISP 200 may calculate a yaw value or a pitch between frames, load a homography transformation value corresponding to the difference from the parameter data 310 stored in the memory 300, and convert the image according to the transformation value.

Figure 4A:
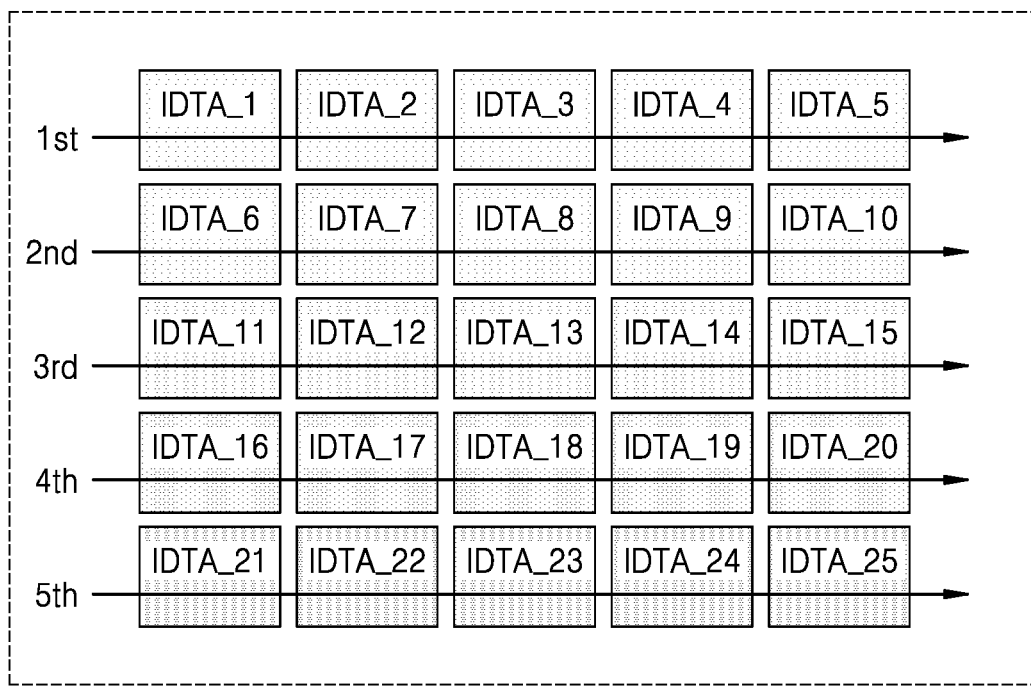
FIGS. 4A, 4B, and 4C are diagrams illustrating a method of rotating a prism lens according to an example embodiment of the present disclosure.
Figure 4B:
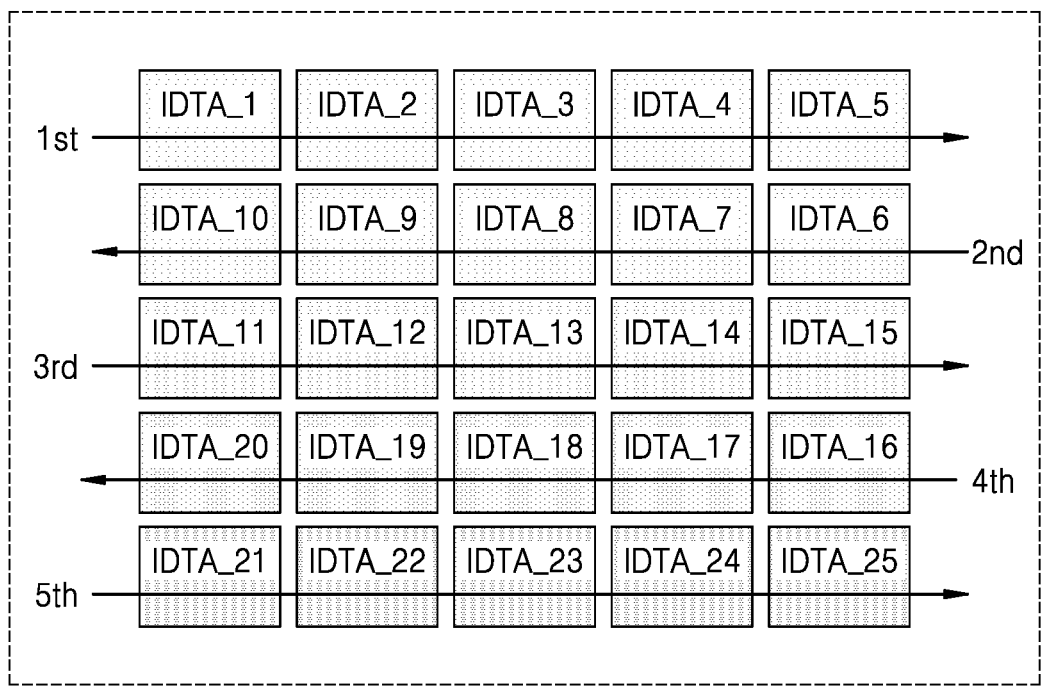
Figure 4C:
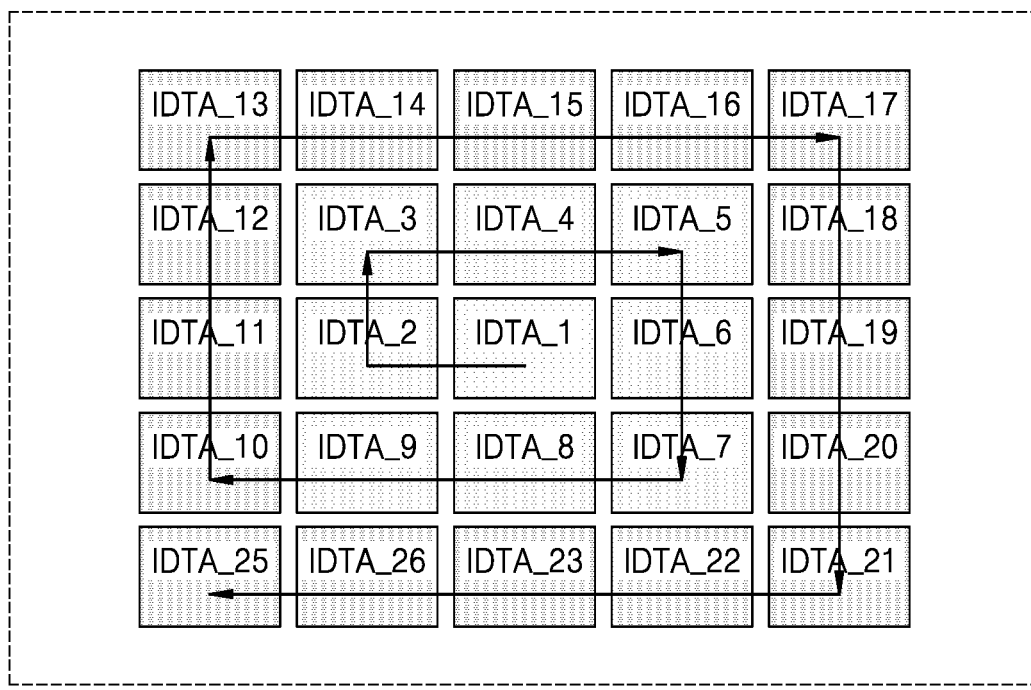

FIGS. 4A, 4B, and 4C are diagrams illustrating a method of rotating an optical device 110 according to an example embodiment of the present disclosure. FIGS. 4A, 4B, and 4C illustrate a case in which image data IDTAa, IDTAb, and IDTAc of a 5×5 matrix array is generated by receiving a mode signal MODES indicating a second mode, unlike FIG. 3. FIG. 1 is referenced together with FIGS. 4A, 4B, and 4C.

Referring to FIG. 4A, the optical device 110 may rotate a total of five times to capture image data sets from left to right in the first horizontal rotation, and the image sensor 100 may sense a first image data IDTA_1 to a fifth image data IDTA_5 in five respective positions. After that, the optical device 110a may rotate down once, and then rotate a total of five times to capture image data sets from left to right in the second horizontal rotation. The image sensor 100 may sense the sixth image data IDTA_6 to the tenth image data IDTA_10 in five respective positions.

Similarly, the optical device 110 may rotate five times to capture additional data sets from left to right in a third horizontal rotation, a fourth horizontal rotation, and a fifth horizontal rotation, respectively. As a result, the image sensor 100 may sequentially sense the eleventh image data IDTA_11 to the fifteenth image data IDTA_15, the sixteenth image data IDTA_16 to the twentieth image data IDTA_20, and the 21st image data IDTA_21 to the 25th image data IDTA_25.

Since the method of sequentially sensing from left to right and from top to bottom illustrated in FIG. 4A is similar to the raster scanning method and is a general scanning method in the field of image processing. it may be relatively easy to apply an algorithm for processing image data.

Referring to FIG. 4B, the optical device 110 may rotate a total of five times to capture image data sets in the first horizontal rotation, and the image sensor 100 may sense the first image data IDTA_1 to the fifth image data IDTA_5. After that, the optical device 110b may rotate down once, and then rotate four times from right to left in the second horizontal rotation, and the image sensor 100 may sense the sixth image data IDTA_6 to the tenth image data IDTA_10.

Similarly, the optical device 110 may rotate four times from left to right in the third horizontal rotation, rotate four times from right to left again in the fourth horizontal rotation, and rotate four times from left to right again in the fifth horizontal rotation. As a result, the image sensor 100 may sequentially generate the eleventh image data IDTA_11 to the fifteenth image data IDTA_15, the sixteenth image data IDTA_16 to the twentieth image data IDTA_20, and the 21st image data IDTA_21 to the 25th image data IDTA_25.

The rotation method of the optical device 110 illustrated in FIG. 4B may be path-efficient compared to FIG. 4A. In more detail, according to the rotation method illustrated in FIG. 4A, after rotating from left to right, image data may be obtained only after the optical device 110 that has already been rotated to the right is rotated to the left when rotating in the horizontal direction under the next row. In contrast, the rotation method illustrated in FIG. 4B uses the already rotated optical device 110b as it is, but only one row in the vertical direction is rotated, so that the horizontal rotation path (or time) of the optical device 110b may be saved.

The image sensor 100 senses a relatively large amount of image data IDTA_(for example, 25) for a short time. As the sensing time increases, the image data IDTA may be distorted due to external factors such as movement of the subject and shaking of the image sensor. According to the technical idea of the present disclosure, distortion of image data IDTA may be minimized by sensing an image in an efficient path.

Referring to FIG. 4C, the image sensor 100 may sense image data IDTA from the center of a scene in which an object of interest is more likely to exist. According to an example embodiment, the image sensor 100 may sense the first image data IDTA_1 while the optical device 110 is not rotated. Thereafter, the second image data IDTA_2 may be sensed by rotating the optical device 110c once to the left, and then, the third image data IDTA_3 may be sensed by rotating the optical device 110c once upward. The fourth and fifth image data IDTA_4 and IDTA_5 may be sensed by rotating the optical device 110 again to the right twice, and then, the sixth and seventh image data IDTA_6 and IDTA_7 may be sensed by rotating the optical device 110 downward again twice.

Similarly, by rotating the optical device 110 to the left three times, the 8th, 9th and 10th image data IDTA_8, IDTA_9, IDTA_10 may be generated. And then, by rotating the optical device 110c upwards three times, the 11th, 12th, and 13th image data IDTA_11, IDTA_12, and IDTA_13 may be generated.

According to the same principle, the 14th, 15th, 16th and 17th image data IDTA_14, IDTA_15, IDTA_16, IDTA_17 may be generated by rotating the optical device 110 to the right four times, and then the 18th, 19th, 20th and 21st image data IDTA_18, IDTA_19, IDTA_20, IDTA_21 may be generated by rotating the optical device 110 downward four times. And then, the 22nd, 23rd, 24th, and 25th image data IDTA_22, IDTA_23, IDTA_24, IDTA_25 may be generated by rotating the optical device 110 to the left four times.

The above process may be described as the optical device 110 rotating clockwise, or in a spiral manner. Though not shown in FIG. 4C, the optical device 110 can also rotate in a counterclockwise direction.

The rotation method of the optical device 110 illustrated in FIG. 4C may be oriented toward an object of interest compared to FIG. 4A or 4B. In general, there is a high probability that the subject lies in the center of the scene. As the sensing time increases, the image data (IDTA) may be distorted due to external factors such as subject movement and image sensor shake. Therefore, by sensing from the center of the scene within a relatively short time, distortion of information on the object of interest may be minimized.

Figure 5:
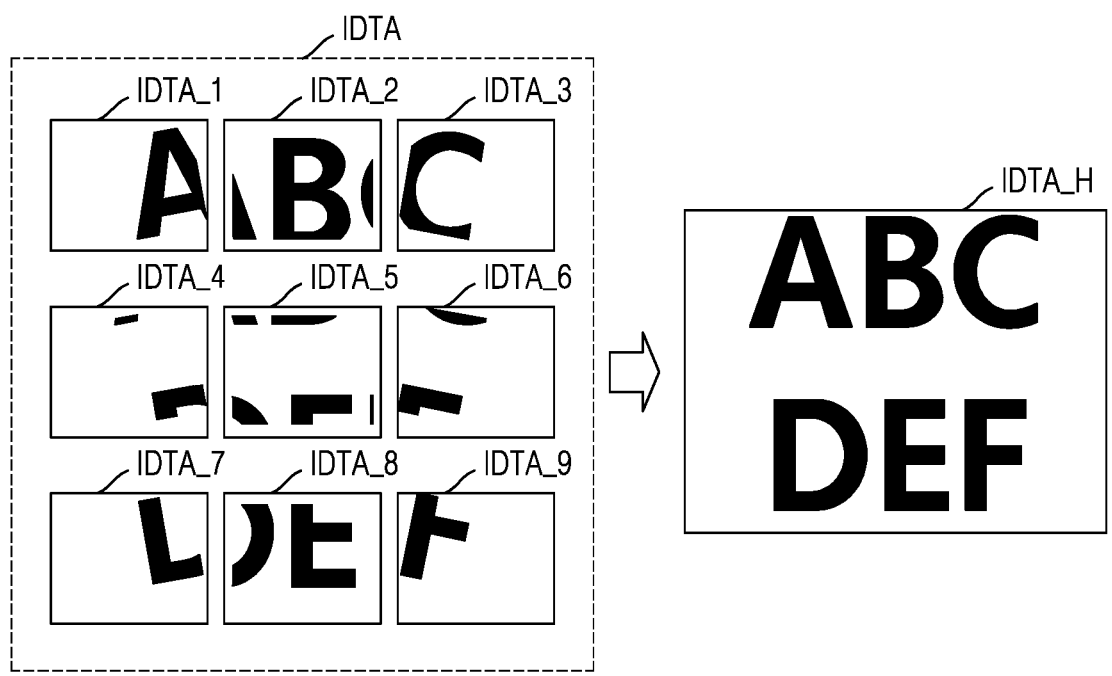
FIG. 5 is a diagram illustrating a method of generating an image in an image generator according to an example embodiment of the present disclosure.

FIG. 5 is a diagram illustrating a method of generating an image in the image generator 210 according to an example embodiment of the present disclosure. FIG. 1 is referenced together with FIG. 5.

Referring to FIG. 5, the image generator 210 may generate high-resolution image data IDTA_H having a relatively wide angle of view by merging a plurality of image data sets IDTAs.

The image generator 210 may merge (i.e., stitch) a plurality of image data sets IDTAs based on the mode signal MODES and the index IDX.

According to an example embodiment, since a first image data IDTA_1 and a second image data IDTA_2 are sensed with a relatively narrow angle of view for the same scene, the included images may be different, but some overlapping regions may exist. The image generator 210 may merge the two image data using an overlapping area between the first image data IDTA_1 and the second image data IDTA_2 by correcting distortion and geometrically transforming each of the first image data IDTA_1 and the second image data IDTA_2.

Similarly, the image generator 210 may merge the second image data IDTA_2 and a third image data IDTA_3. As a result, the image generator 210 may generate high-resolution image data IDTA_H having a wide angle of view. High resolution image data IDTA_H generated by merging images having a relatively narrow view angle may have a higher resolution than image data IDTA sensed by an image sensor having the same resolution but a wide view angle.

Geometric transformation and distortion correction are typically required to merge a plurality of image data IDTAs. A large amount of computation is typically used to transform and correct a plurality of image data IDTAs in real time, which may cause a decrease in image processing speed. The camera module or the image processing method according to certain embodiments of the present disclosure may minimize an amount of computation by referring to a parameter PRMT previously stored based on a fixed geometric characteristic.

Figure 6:
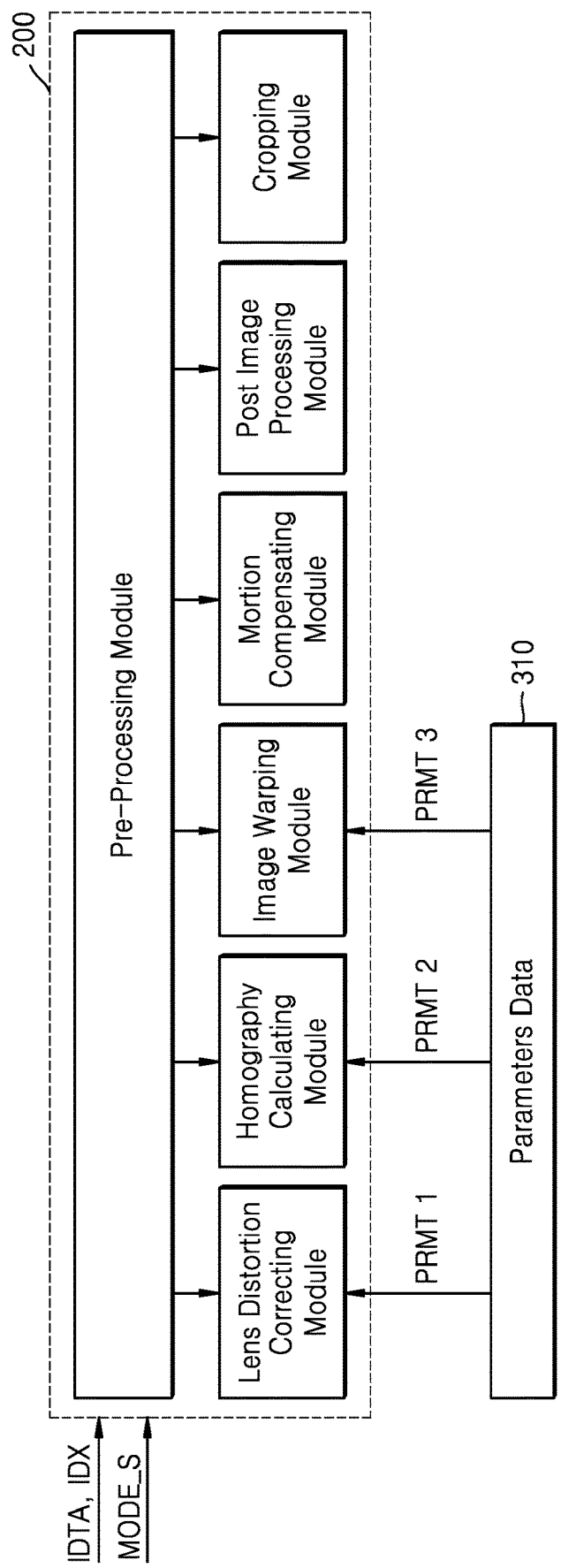
FIG. 6 is a block diagram showing a post-processing operation in an image signal processor according to an example embodiment of the present disclosure.

FIG. 6 is a block diagram illustrating a processing operation in an image signal processor according to an example embodiment of the present disclosure.

The ISP 200 may pre-process or post-process the sensed image data IDTA. The ISP 200 may include a pre-processing module, a lens distortion correction module, a homography calculation module, an image warping module, a motion compensation module, a pre-processing or post-processing module, and a cropping module.

The pre-processing may mean pre-processing appropriately for the purpose of application and use of an image enhancement algorithm to image artifacts. For example, the pre-processing may be a pre-processing operation for removing distortion of the sensed image data IDTA and improving algorithm performance such as white balancing, denoising, demosaicing, lens shading, gamma corrections, edge detection, edge enhancement, and the like.

The post-processing may mean application of an image enhancement algorithm to image artifacts. For example, the post-processing may be a post-processing operation of removing distortion of the sensed image data IDTA such as white balancing, denoising, demosaicing, lens shading, gamma corrections, and the like.

Lens distortion correction may mean correcting that an image caused by a lens projection center is not accurately formed at the focus when there is an abnormality on the lens surface or refraction. For example, image distortion may occur in an edge region of the optical device 110.

In an example embodiment, lens distortion correction may be performed by Equation 1 below.

$$L = \begin{bmatrix} 1 + k_1 * r_u^2 + k_2 * r_u^4 & 0 & 2*p_1*u_u*u_v + p_2(r_u^2 + 2u_u^2) \\ 0 & 1 + k_1 * r_u^2 + k_2 * r_u^4 & 2*p_2*u_u*u_v + p_1(r_u^2 + 2v_u^2) \\ 0 & 0 & 1 \end{bmatrix}$$ 
[Equation 1]

Here, $k_1$, $k_2$, and $r_u^2$, $r_u^4$ are parameters related to radial aberration of distortion aberration, and, $P_1$, $P_2$, $U_u$, and $U_V$ are parameters related to non-central distortion.

In order to individually correct a plurality of image data sets IDTAs, calculations between many parameters shown in Equation 1 are required. According to the technical ideas of the present disclosure, since the geometrical characteristics of the image data sets IDTA are fixed, the ISP 200 may omit a complicated calculation step by referring to a first parameter PRMT1 related to lens distortion correction from the parameter data 310 previously calculated and stored in the memory 300, as if actually correcting. For convenience of explanation, one method for correcting lens distortion has been illustrated, but it should be understood that various lens distortion correction methods may be applied.

Homography is a term that may refer to a mapping relationship or transformation relationship established between 3D camera coordinates or 2D image coordinates for a planar object. In more detail, the homography may refer to a linear transformation relationship between two points captured at two different positions for a planar object in a three-dimensional space. After a correspondence point for two images is searched, parameters necessary for a homography operation may be extracted based on the correspondence point.

In an example embodiment, the homography may be expressed by Equation 2 below.

$$\begin{bmatrix} x_1 \\ y_1 \\ 1 \end{bmatrix} = \begin{bmatrix} h_{00} & h_{01} & h_{02} \\ h_{10} & h_{11} & h_{12} \\ h_{20} & h_{21} & h_{22} \end{bmatrix} * \begin{bmatrix} x_2 \\ y_2 \\ 1 \end{bmatrix}$$ 
[Equation 2]

Here, $h_{00}$ $h_{01}$ $h_{02}$ $h_{10}$ $h_{11}$ $h_{12}$ $h_{20}$ $h_{21}$ $h_{22}$ are homography parameters. According to the technical ideas of the present disclosure, since the geometric characteristic of the image data sets IDTA is fixed, the ISP 200 may omit a complicated operation step for calculating homography by referring to a second parameter PRMT2 related to homography from the parameter data 310 stored in the memory 300, as an actual correction. The ISP 200 may load a homography parameter (i.e., a homography coefficient) stored in the memory 300 to apply a homography transform value to the sensed image.

Image warping is the projection of images of different angles onto one image plane. Image warping may be expressed by Equation 3 below.

$$\begin{bmatrix} wx \\ wy \\ w \end{bmatrix} = \begin{bmatrix} a & b & c \\ d & e & f \\ g & h & 1 \end{bmatrix} * \begin{bmatrix} x \\ y \\ 1 \end{bmatrix}$$ 
[Equation 3]

Here, a, b, c, d, e, f, g, and h are warping parameters, x and y are original coordinates, wx and wy are warped coordinates.

According to the technical ideas of the present disclosure, since the geometric characteristic of the image data sets IDTA is fixed, the ISP 200 may omit a complicated operation step for calculating image warping by referring to a third parameter PRMT3 related to image warping from the parameter data 310 stored in the memory 300, as an actual correction.

Here, the parameter data 310 may be stored in a common area of the memory 300 or may be separated and stored in different areas. Also, it is not excluded that the memory 300 may include a plurality of memory devices.

Thereafter, motion compensation for the shake of the camera module is performed, and then post-processing of the image processor is performed. Post-processing may refer to application of an image enhancement algorithm to image artifacts. For example, the post-processing may include various processing methods for removing distortion of the sensed image data IDTA and performing additional correction such as white balancing and denoising, demosaicing, lens shading, gamma corrections, and the like.

Finally, by cropping each image and stitching the cropped images into one image, a large-sized image (or an image with a wide angle of view) for a low-resolution image may be generated. For example, an image with a shallow depth (short focal length) may be generated based on an image with a deep depth (long focal length).

Figure 7:
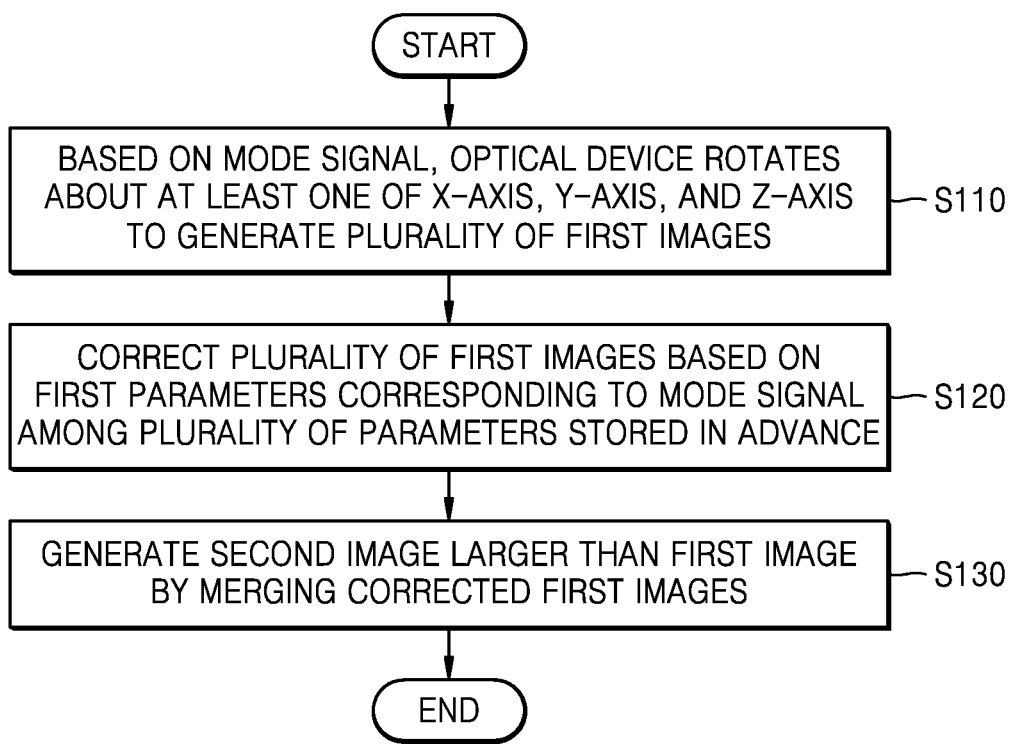
FIG. 7 is a flow chart showing an image processing method according to an example embodiment of the present disclosure.

FIG. 7 is a flow chart showing an image processing method according to an example embodiment of the present disclosure. FIG. 1 is referenced together with FIG. 7.

In step S110, as a result of rotation of the optical device 110 using at least one of the x-axis, y-axis, and z-axis as an axis, the image sensor 100 may generate a plurality of first images (i.e., image data IDTA) based on the mode signal MODES.

In step S120, the ISP 200 may correct a plurality of first images based on first parameters corresponding to the mode signal among a plurality of parameters PRMT previously stored in the memory 300.

In step S130, a second image larger than each first image may be generated by merging the corrected first images. Each first image may correspond to image data IDTA, and the second image may correspond to high resolution image data IDTA_H. The first image may have a deeper depth of field or a longer focal length than the second image.

Figure 8:
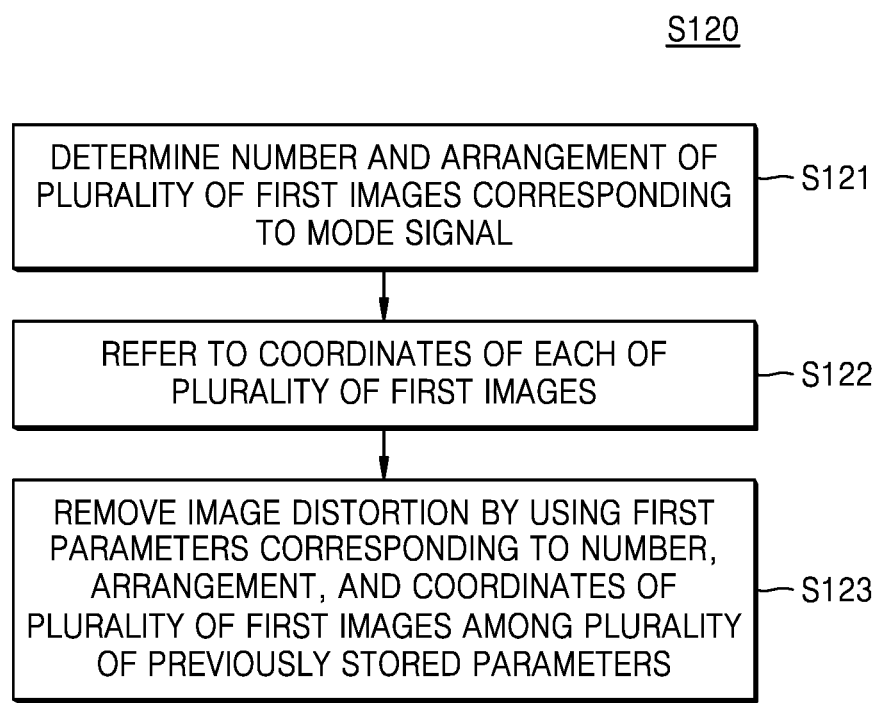
FIG. 8 is a detailed flowchart illustrating a correction method among image processing methods according to an example embodiment of the present disclosure.

FIG. 8 is a detailed flowchart illustrating a correction method among image processing methods according to an example embodiment of the present disclosure. FIGS. 1 and 7 are referenced together with FIG. 8.

The method S120 for correcting the image data IDTA may be subdivided as follows.

In step S121, the number and arrangement of the plurality of first images corresponding to the mode signal MODES may be determined.

In step S122, coordinates of each of the plurality of first images may be referenced. The coordinates may be related to a fixed geometrical characteristic contained in the image data IDTA.

In step S123, image distortion may be removed by using first parameters corresponding to the number, arrangement, and coordinates of a plurality of first images among the plurality of parameters PRMT previously stored in the parameter data 310 area of the memory 300.

Figure 9A:
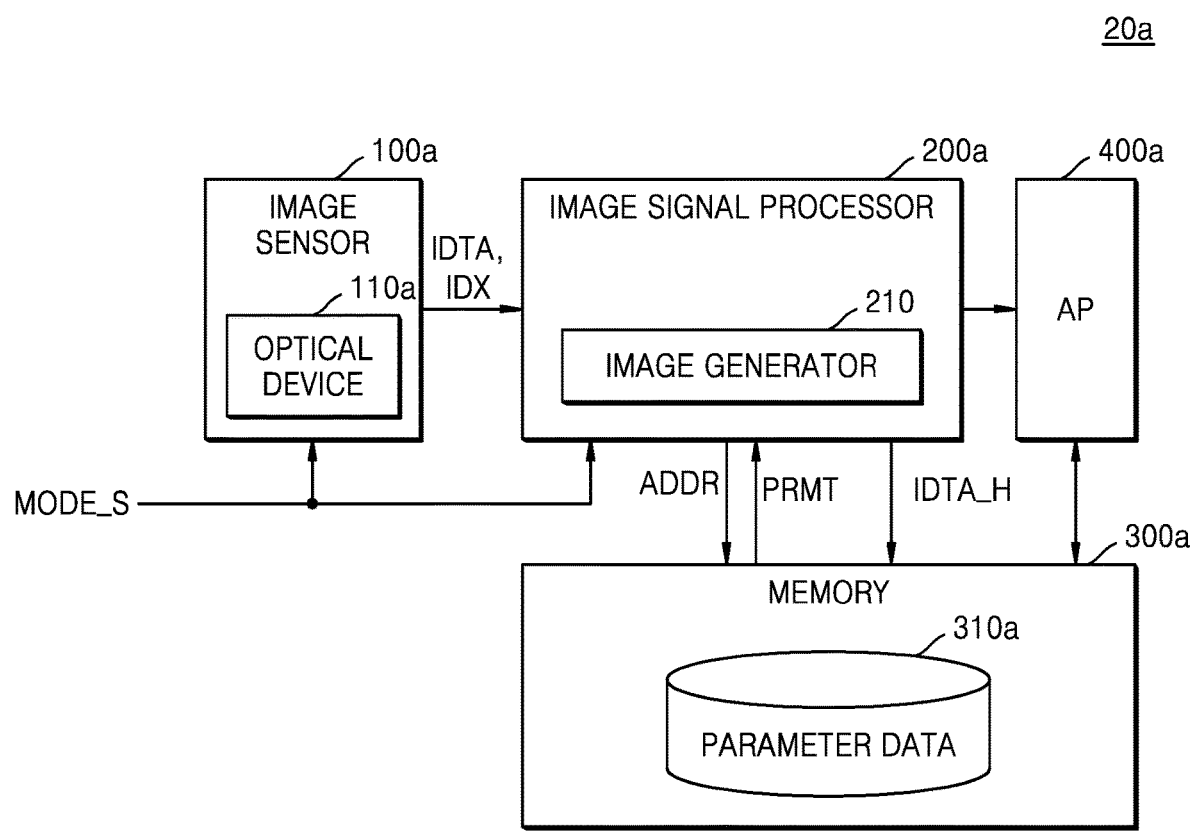
FIGS. 9A and 9B are block diagrams illustrating an imaging device according to an example embodiment of the present disclosure.
Figure 9B:
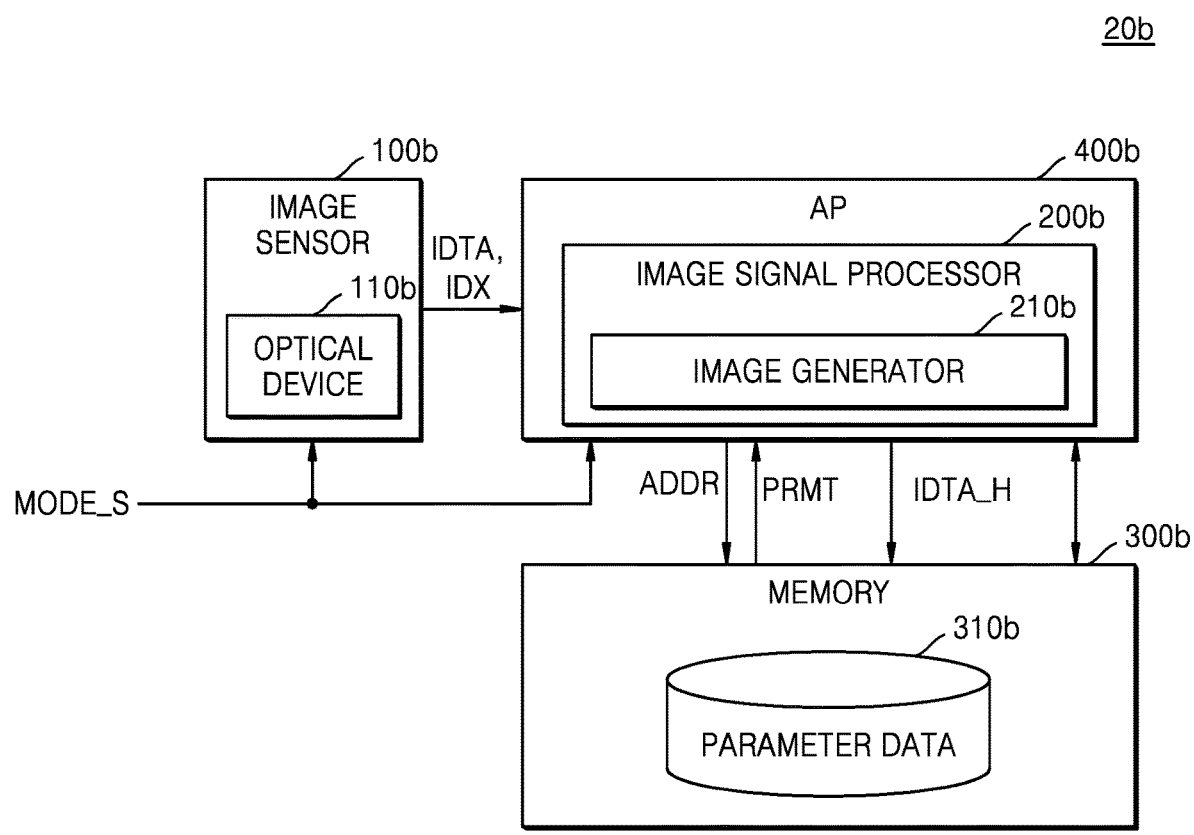

FIGS. 9A and 9B are block diagrams illustrating imaging devices 20a and 20b according to an example embodiment of the present disclosure. FIG. 1 is referenced together with FIGS. 9A and 9B.

Compared with FIG. 1, in FIGS. 9A and 9B, an application processor (AP) is further illustrated. Imaging devices 20a and 20b may further include APs 400a and 400b. The APs 400a and 400b may be a central processing unit (CPU), a microprocessor, or a microcontroller unit (MCU), but are not limited thereto.

ISPs 200a and 200b and the APs 400a and 400b may be implemented as a processing circuit such as hardware including a logic circuit, or as a combination of hardware and software, such as a processor that executes software that performs image processing. In particular, the processing circuit may be implemented as a central processing unit (CPU), an arithmetic logic unit (ALU) that performs arithmetic and logic operation, bit shift, etc., a digital signal processor (DSP), a microprocessor, an application specific integrated circuit (ASIC), or the like, but is not limited thereto.

Referring to FIG. 9A, the imaging device 20a may include an image sensor 100a including an optical device 110a, an ISP 200a including an image generator 210a, a memory 300a including parameter data 310a, and an AP 400a. In FIG. 1, the image sensor 100, the ISP 200, the memory 300, and the like have been described above, and redundant descriptions are omitted.

In FIG. 9A, unlike FIG. 1, a memory is not included in the camera module (10 in FIG. 1), and the memory is included in the imaging device 20a. For example, the ISP 200a in FIG. 9A may merge images by referring to the memory (e.g., S-RAM and D-RAM) mounted inside the imaging device 20a without referring to the memory (e.g., OTP memory) mounted on the camera module 10. For example, the camera module 10 of FIG. 1 may include an image sensor 100 and optical device 110 physically housed within a particular housing (e.g., on a mobile phone, or within a particular compartment of a mobile phone, laptop computer, tablet, camera, or other device), whereas in embodiments such as FIG. 9A, an image sensor 100a including an optical device 110a may be separately housed from the other components shown (e.g., the image sensor 100a may be in separate compartment of a mobile phone, laptop computer, or tablet, or may be part of a camera or other device connected wirelessly or via a wire to a computer that includes the ISP 200a, AP 400, and memory 300a).

Referring to FIG. 9B, the ISP 200b may be implemented inside the AP 400b. In this case, the AP 400b of the imaging device 20b may be a processor that executes software that performs image processing in particular, and the ISP 200b may be implemented as software or a combination of hardware and software.

Figure 10A:
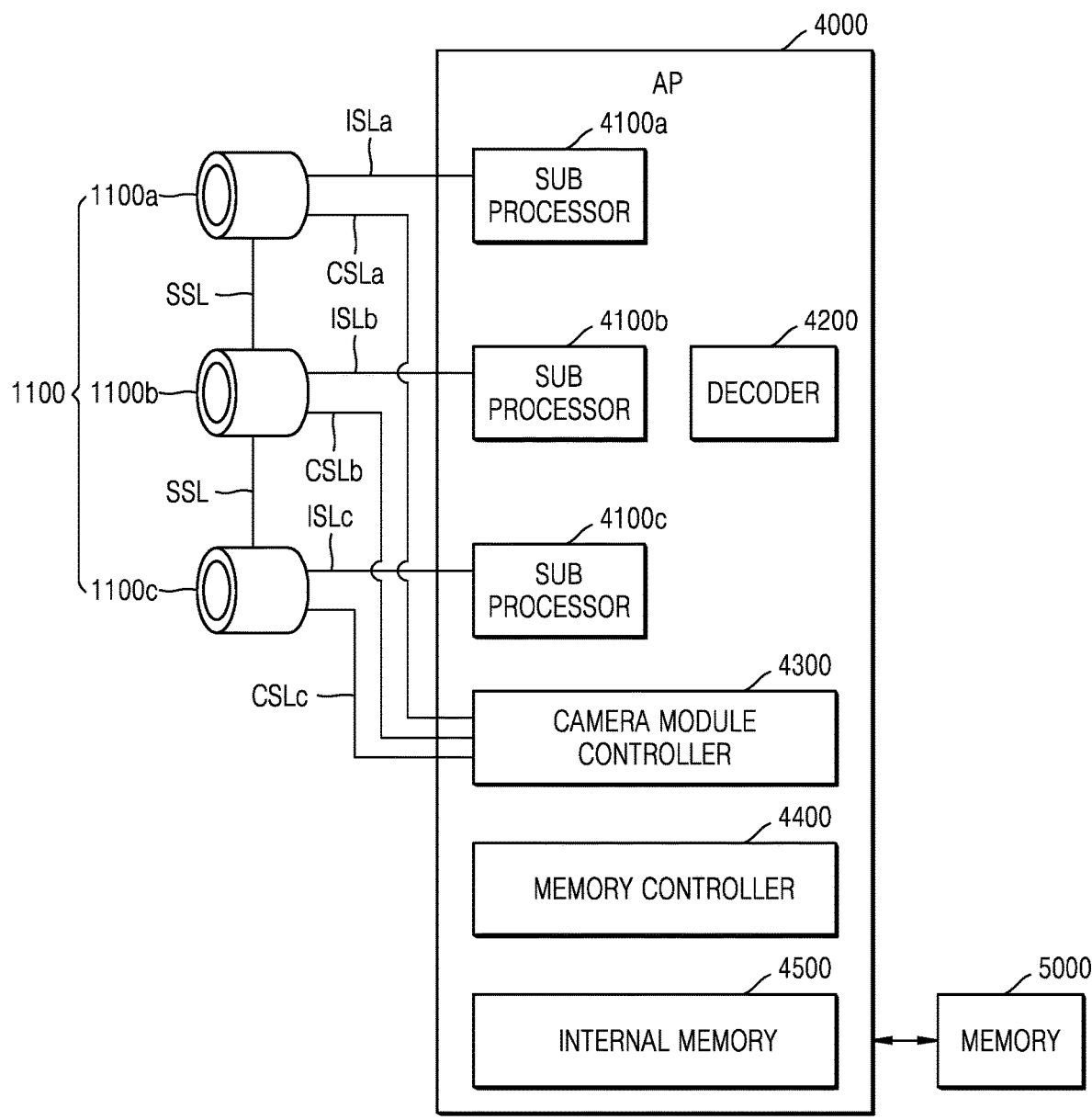
FIGS. 10A and 10B are block diagrams illustrating an imaging device including a plurality of camera modules according to an example embodiment of the present disclosure.
Figure 10B:
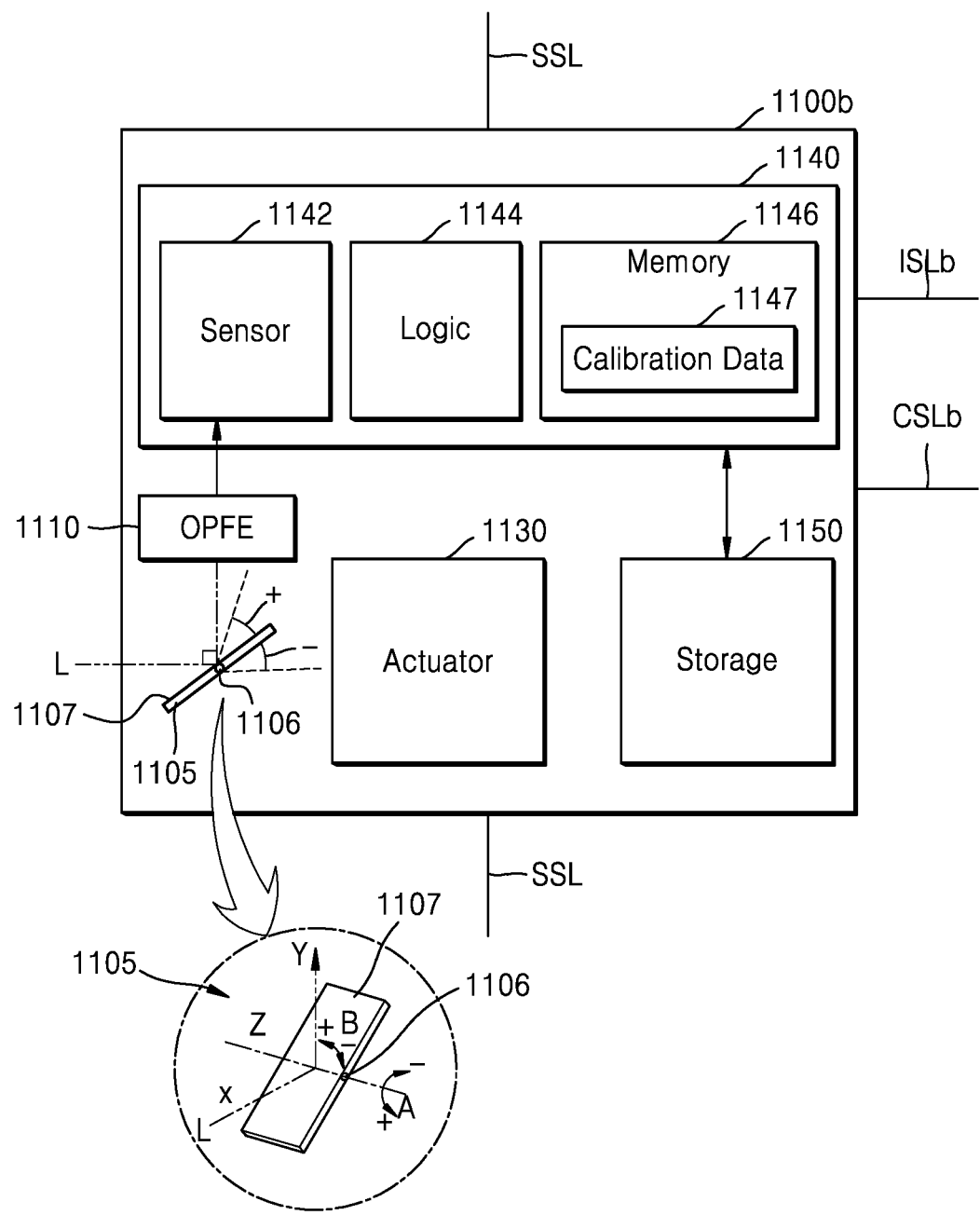

FIGS. 10A and 10B are block diagrams illustrating an imaging device including a plurality of camera modules according to an example embodiment of the present disclosure.

Referring to FIG. 10A, an electronic device 20000 may include a multi-camera module 1100, an AP 4000, and a memory 5000. The memory 5000 may perform the same function as the memory 300 illustrated in FIG. 1, and a redundant description will be omitted. At least one of the camera modules 1100a, 1100b, and 1100c of FIG. 10A may perform a function similar to the camera module 10 of FIG. 1.

The electronic device 20000 may capture and/or store an image of a subject using a CMOS image sensor, and may be implemented as a mobile phone, a tablet computer, or a portable electronic device. Portable electronic device may include a laptop computer, a mobile phone, a smart phone, a tablet PC, a wearable device, and the like. The electronic device 20000 may include one or more camera modules and an AP that processes image data generated from one or more camera modules.

The multi-camera module 1100 may include a first camera module 1100a, a second camera module 1100b, and a third camera module 1100c. The multi-camera module 1100 may perform the same function as the camera module 3 of FIG. 2. Although three camera modules 1100a to 1100c are illustrated for convenience of description, the present invention is not limited thereto, and various numbers of camera modules may be included in the multi-camera module 1100.

The angle of view, or field of view, of the first camera module 1100a may be larger than that of the second camera module 1100b. According to an example embodiment of the present disclosure, a second camera module 1100b may include an optical device (100 of FIG. 1), may generate a plurality of image data sets IDTAs by rotating the optical device 110, and stitch the image data sets IDTAs by using a pre-stored parameter PRMT. As a result, the second camera module 1100b may generate a high-resolution image having a view angle similar to the view angle of the first camera module 1100a but having a relatively high resolution.

Hereinafter, a detailed configuration of the camera module 1100b will be described in more detail with reference to FIG. 10B, but the following description may be equally applied to other camera modules 1100a and 1100c according to an embodiment.

Referring to FIG. 10B, the second camera module 1100b may include a prism 1105, an optical path folding element (hereinafter referred to as "OPFE") 1110, an actuator 1130, an image sensing device 1140, and a storage unit 1150.

The prism 1105 may change the path of the light L incident from the outside including a reflective surface 1107 of a light reflecting material.

According to an example embodiment, the prism 1105 may change the path of the light L incident in a first direction X to a second direction Y perpendicular to the first direction X. Also, the prism 1105 may rotate the reflective surface 1107 of the light reflecting material in A direction with respect to a central axis 1106, or may rotate the central axis 1106 in B direction, so that the path of the light L incident in the first direction X may be changed to the second direction Y, which is perpendicular. In this case, the OPFE 1110 may also move in a third direction Z perpendicular to the first direction X and the second direction Y.

In an example embodiment, as shown, the maximum rotation angle of the prism 1105 in the A direction is equal to or less than 21 degrees in the positive (+) A direction, and may be greater than 21 degrees in the negative (−) A direction, but embodiments are not limited thereto.

In an example embodiment, the prism 1105 may move in the plus (+) or minus (−) B direction about 20 degrees, or between 10 degrees and 20 degrees, or between 15 degrees and 20 degrees. Here, the moving angle may move at the same angle in the plus (+) or minus (−) B direction, or may move up to a substantially similar angle in a range of about 1 degree, but is not limited thereto.

In an example embodiment, the prism 1105 may move the reflective surface 1107 of the light reflecting material in a third direction (e.g., the Z direction) parallel to the extending direction of the central axis 1106.

The OPFE 1110 may include, for example, an optical lens consisting of m (where m is a natural number) groups. The m lenses may move in the first direction X to change the optical zoom ratio of the camera module 1100b. For example, assuming that the default optical zoom magnification of the camera module 1100b is Z, when m optical lenses included in the OPFE 1110 are moved, the optical zoom magnification of the camera module 1100b may be changed to 3Z, 5Z, or more than 5Z.

The actuator 1130 may move the OPFE 1110 or the optical lens (hereinafter referred to as an optical lens) to a specific position. For example, the actuator 1130 may adjust the position of the optical lens so that an image sensor 1142 is positioned at a focal length of the optical lens for accurate sensing.

The image sensing device 1140 may include the image sensor 1142, a control logic 1144, and a memory 1146. The image sensor 1142 may sense an image of a sensing target using light L provided through the optical lens. Since the image sensor 1142 of FIG. 10B may be functionally similar to the image sensor 10 of FIG. 2, a redundant description is omitted. The control logic 1144 may control the overall operation of the second camera module 1100b. For example, the control logic 1144 may control the operation of the second camera module 1100b according to a control signal provided through the control signal line CSLb.

The memory 1146 may store information used for the operation of the second camera module 1100b such as calibration data 1147. The calibration data 1147 may include information necessary for the second camera module 1100b to generate image data using light L provided from the outside. The calibration data 1147 may include, for example, information on a degree of rotation, information on a focal length, information on an optical axis, and calibration information used for image processing. When the second camera module 1100b is implemented in the form of a multi-state camera whose focal length is changed according to the position of the optical lens, the calibration data 1147 may include a focal length value for each position (or state) of the optical lens and information related to auto focusing.

The storage unit 1150 may store image data sensed through the image sensor 1142. The storage unit 1150 may be placed outside the image sensing device 1140, and may be implemented in a form stacked with a sensor chip constituting the image sensing device 1140. In an example embodiment, the storage unit 1150 may be implemented as an EEPROM (Electrically Erasable Programmable Read-Only Memory), but embodiments are not limited thereto.

In an example embodiment, each of the plurality of camera modules 1100a, 1100b, and 1100c may include the actuator 1130. Accordingly, each of the plurality of camera modules 1100a, 1100b, and 1100c may include the same or different calibration data 1147 according to the operation of the actuator 1130 included therein.

In an example embodiment, one of the plurality of camera modules 1100a, 1100b, and 1100c (for example, the second camera module 1100b) is a folded lens type camera module including the prism 1105 and OPFE 1110 described above, and the remaining camera modules (e.g., 1100a and 1100b) may be vertical type camera modules that do not include the prism 1105 and the OPFE 1110, but embodiments are not limited thereto.

In an example embodiment, one of the plurality of camera modules 1100a, 1100b, and 1100c (e.g., the third camera module 1100c) may be, for example, a vertical type depth camera that extracts depth information by using infrared ray (IR). In this case, an AP 4000 may generate a 3D depth image by merging image data provided from such a depth camera with image data provided from another camera module (for example, the first camera module 1100a or the second camera module 1100b).

In an example embodiment, at least two camera modules (for example, the first camera module 1100a or the second camera module 1100b) among the plurality of camera modules 1100a, 1100b, and 1100c may have different fields of view (viewing angles) from each other. In this case, for example, optical lenses of at least two camera modules (for example, the first camera module 1100a or the second camera module 1100b) among the plurality of camera modules 1100a, 1100b, and 1100c may be different from each other, but are not limited thereto. For example, among the plurality of camera modules 1100a, 1100b, and 1100c, the first camera module 1100a may have a smaller field of view (FOV) than the second and third camera modules 1100b and 1100c. However, the present invention is not limited thereto, and the multi-camera module 1100 may further include a camera module having a larger field of view (FOV) than the originally used camera modules 1100a, 1100b, and 1100c.

Further, in some embodiments, viewing angle of each of the plurality of camera modules 1100a, 1100b, and 1100c may be different. In this case, optical lenses included in each of the plurality of camera modules 1100a, 1100b, and 1100c may also be different from each other, but the present invention is not limited thereto.

In some embodiments, each of the plurality of camera modules 1100a, 1100b, and 1100c may be physically separated from each other. For example, in one embodiment, the sensing area of one image sensor 1142 is not divided and used by the plurality of camera modules 1100a, 1100b, 1100c, but an independent image sensor 1142 may be placed inside each of the plurality of camera modules 1100a, 1100b, and 1100c.

The AP 4000 may include a plurality of sub-processors 4100*a*, 4100*b*, and 4100*c*, a decoder 4200, a camera module controller 4300, a memory controller 4400, and an internal memory 4500.

The AP 4000 may be implemented separately from the plurality of camera modules 1100*a*, 1100*b*, and 1100*c*. For example, the AP 4000 and the plurality of camera modules 1100*a*, 1100*b*, and 1100*c* may be implemented by being separated from each other as separate semiconductor chips.

Image data generated from each of the camera modules 1100*a*, 1100*b*, and 1100*c* may be provided to the corresponding subprocessors 4100*a*, 4100*b*, and 4100*c* through image signal lines ISLa, ISLb, and ISLc separated from each other. For example, image data generated by the first camera module 1100*a* may be provided to the first subprocessor 4100*a* through the first image signal line ISLa, image data generated by the second camera module 1100*b* is provided to the second subprocessor 4100*b* through the second image signal line ISLb, and image data generated by the third camera module 1100*c* may be provided to the third subprocessor 4100*c* through the third image signal line ISLc. Such image data transmission may be performed using, for example, a camera serial interface (CSI) based on a Mobile Industry Processor Interface (MIPI), but embodiments are not limited thereto.

In an example embodiment, one subprocessor may be arranged to correspond to a plurality of camera modules. For example, the first sub-processor 4100*a* and the third sub-processor 4100*c* are not implemented separately from each other as shown, but are implemented as a single sub-processor, and image data provided from the camera module 1100*a* and the camera module 1100*c* may be selected through a selection element (e.g., a multiplexer) or the like, and then provided to the integrated sub-image processor.

A camera module controller 4300 may provide a control signal to each of the camera modules 1100*a*, 1100*b*, and 1100*c*. The control signal generated by a camera module controller 1216 may be provided to the corresponding camera modules 1100*a*, 1100*b*, and 1100*c* through control signal lines CSLa, CSLb, and CSLc separated from each other.

Any one of the plurality of camera modules 1100*a*, 1100*b*, and 1100*c* may be designated as a master camera (for example, 1100*b*) according to image generation information including a zoom signal or a mode signal, and the remaining camera modules (e.g., 1100*a* and 1100*c*) may be designated as slave cameras. Such information may be included in the control signal and provided to the corresponding camera modules 1100*a*, 1100*b*, and 1100*c* through separate control signal lines CSLa, CSLb, and CSLc.

Under the control of the camera module controller 4300, camera modules 1100*a*, 1100*b*, and 1100*c* operating as master and slave may be changed. For example, when the viewing angle of the first camera module 1100*a* is wider than the viewing angle of the second camera module 1100*b* and the zoom factor indicates a low zoom magnification, the second camera module 1100*b* may operate as a master, and the first camera module 1100*a* may operate as a slave. Conversely, when the zoom factor indicates a high zoom magnification, the first camera module 1100*a* may operate as a master and the second camera module 1100*b* may operate as a slave.

In an example embodiment, a control signal provided from the camera module controller 4300 to each of the camera modules 1100*a*, 1100*b*, and 1100*c* may include a sync enable signal. For example, when the second camera module 1100*b* is a master camera and the first and third camera modules 1100*a* and 1100*c* are slave cameras, the camera module controller 4300 may transmit the sync enable signal to the second camera module 1100*b*. The second camera module 1100*b* receiving such a sync enable signal may generate a sync signal based on the provided sync enable signal, and provide the generated sync signal to the first and third camera modules 1100*a* and 1100*c* through a sync signal line SSL. The first camera module 1100*b*, the second and third camera modules 1100*a* and 1100*c* may transmit image data to the AP 4000 in synchronization with the sync signal.

While the inventive concept has been particularly shown and described with reference to embodiments thereof, it will be understood that various changes in form and details may be made therein without departing from the spirit and scope of the following claims.

What is claimed is:

1. A camera module comprising:
   an image sensor including an optical device configured to rotate about at least one of an x-axis, a y-axis, and a z-axis perpendicular to each other, in response to a mode signal, and being configured to generate a plurality of first images used to generate a single, second image, each first image generated when the optical device is at a different position; and
   an image signal processor (ISP) configured to process the plurality of first images to generate the second image,
   wherein the ISP is further configured to obtain a plurality of parameters pre-stored according to the mode signal, correct the plurality of first images by using a specific set of parameters of the plurality of parameters that corresponds to a particular value of the mode signal, and generate the second image by merging the corrected first images,
   wherein the second image is greater in size than each first image in terms of number of pixels.

2. The camera module of claim 1, wherein the plurality of parameters include at least one of a homography parameter, a lens distortion correction parameter, and a warping parameter.

3. The camera module of claim 2, wherein the plurality of parameters include the homography parameter, and the homography parameter is predetermined with respect to a number of the plurality of first images, an arrangement of the plurality of first images, and coordinates of each of the plurality of first images which are determined based on the mode signal.

4. The camera module of claim 1, wherein the ISP is further configured to obtain arrangement information of the plurality of first images combined to form the second image by receiving the mode signal.

5. The camera module of claim 1, wherein the image sensor is configured to sense an image using a rotation of at least one of yawing, pitching, and rolling.

6. The camera module of claim 1, wherein the optical device includes a prism lens or a mirror.

7. The camera module of claim 6, wherein the optical device is further configured to generate the plurality of first images by horizontally rotating from left to right while rotating from top to bottom.

8. The camera module of claim 6, wherein the optical device is further configured to sense the plurality of first images while rotating clockwise or counterclockwise from a center to a periphery.

9. The camera module of claim 1, further comprising a memory, wherein the plurality of parameters are stored in the memory.

10. The camera module of claim 9, wherein the ISP is further configured to provide an address for loading the plurality of parameters to the memory, based on the mode signal, and the memory is configured to provide the plurality of parameters corresponding to the mode signal to the ISP, based on the address.

11. An image processing method of a camera module capable of generating an image with a large angle of view from an image with a small angle of view, the image processing method comprising:

generating a plurality of first images by rotating an optical device which uses a lens or a mirror about at least one of an x-axis, a y-axis, and a z-axis perpendicular to each other, in response to a mode signal, each first image generated when the optical device is at a different position and each first image having a first angle of view;

correcting the plurality of first images based on first parameters corresponding to the mode signal, from among a plurality of pre-stored parameters; and generating a second image greater in size than the first image and having a second angle of view greater than the first angle of view, by merging the corrected first images.

12. The image processing method of claim 11, wherein the correcting the plurality of first images includes:

transforming the plurality of first images into perspective projections based on a homography parameter;

correcting distortion of the optical device based on a lens distortion correction parameter; and changing the form of the plurality of first images based on a warping parameter.

13. The image processing method of claim 12, wherein the homography parameter is predetermined with respect to the number and arrangement of the plurality of first images, and with respect to coordinates of each of the plurality of first images which are determined based on the mode signal.

14. The image processing method of claim 11, wherein the correcting the plurality of first images includes:

determining the number of the plurality of first images, and an arrangement of the plurality of first images corresponding to the mode signal;

referring to coordinates of each of the plurality of first images; and removing image distortion by using the first parameters corresponding to the number, arrangement, and coordinates of the plurality of pre-stored parameters.

* * * * *